122,902

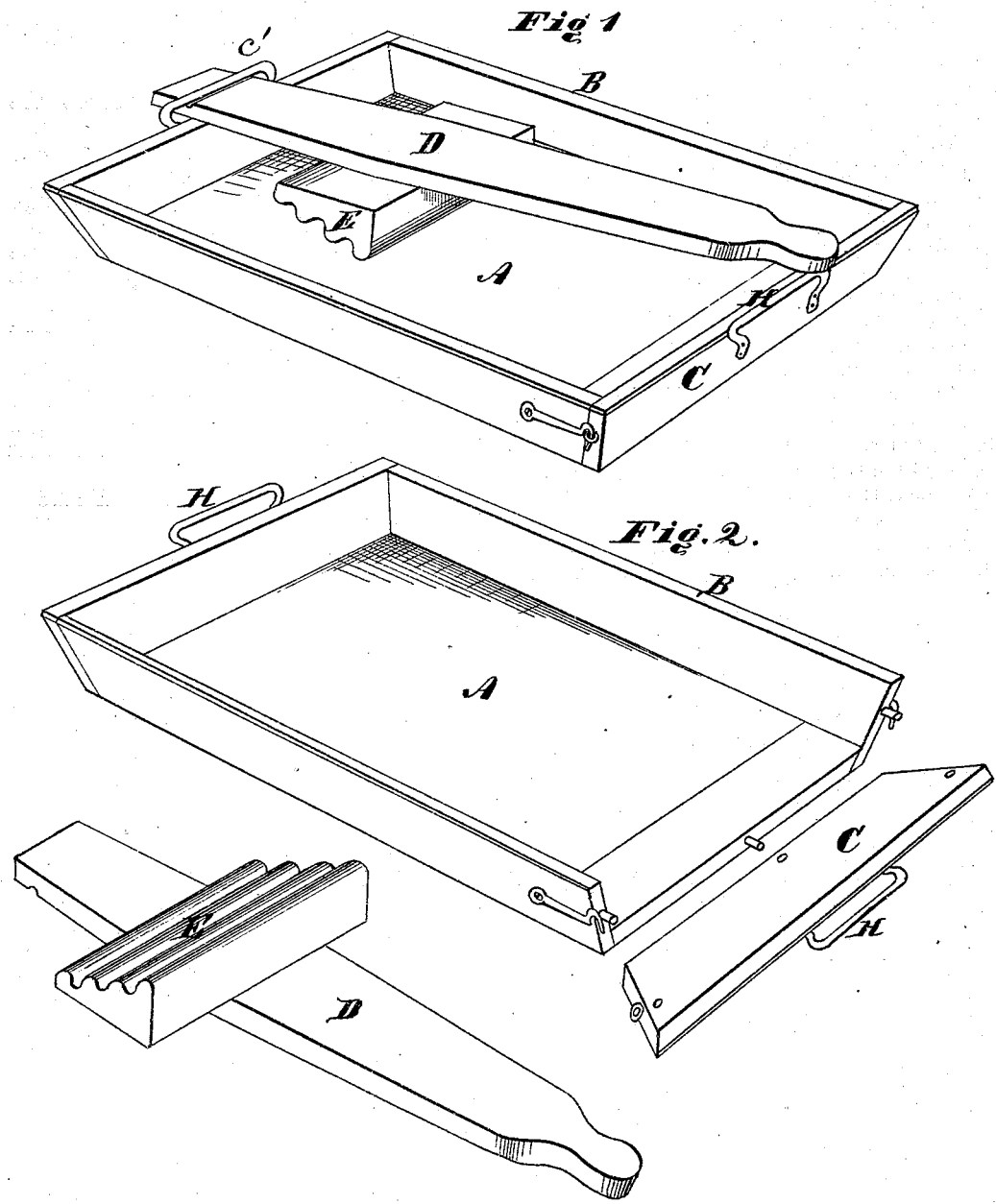

UNITED STATES PATENT OFFICE.

EBENEZER MATHERS, OF HARRISVILLE, WEST VIRGINIA.

IMPROVEMENT IN DOUGH-KNEADERS.

Specification forming part of Letters Patent No. 122,902, dated January 23, 1872.

*To all whom it may concern:*

Be it known that I, EBENEZER MATHERS, of the town of Harrisville, county of Ritchie and State of West Virginia, have invented a new and useful Improvement in Machines for Kneading Dough; and I do hereby declare that the following is a clear, full, and exact description of the same, reference being had to the annexed drawing making a part of this specification, in which—

Figures 1 and 2 are perspective views, with letters of reference thereon.

A, tray of convenient size for family use; B, raised rim of tray, say four inches deep; C, movable end of rim, shown detached in Fig. 2; D, lever to which the break-block E is secured; E, break-block, the under side of which is corrugated; H, handles at each end of tray, the fixed handle at $c'$ serving as a fulcrum for the lever D, thus allowing full range for the operation of the break on any and every part of the tray-board.

The object of my invention is to do away with the hard and painful operation to which the housewife is subjected in kneading dough by hand, and especially the strain on the wrist which is so much complained of, at the same time doing the work more effectually and in less time.

What I claim as new, and desire to secure by Letters Patent, is—

The combination of the tray A with the movable end C, the handles H H with the lever D and break-block E, arranged and operating in the manner and for the purposes as above set forth.

EBENEZER MATHERS.

Witnesses:
W. E. HALL,
J. N. PEIRPOINT.